United States Patent
Suzuki et al.

(10) Patent No.: US 8,531,559 B2
(45) Date of Patent: Sep. 10, 2013

(54) IMAGING APPARATUS, IMAGE PROCESSING METHOD AND COMPUTER-READABLE STORAGE MEDIUM

(75) Inventors: Hiroshi Suzuki, Akiruno (JP); Takanori Ishihama, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/302,180

(22) Filed: Nov. 22, 2011

(65) Prior Publication Data
US 2012/0127338 A1 May 24, 2012

(30) Foreign Application Priority Data
Nov. 24, 2010 (JP) ................................ 2010-260873

(51) Int. Cl.
*H04N 9/64* (2006.01)
*H04N 5/235* (2006.01)

(52) U.S. Cl.
USPC ........................................ 348/244; 348/229.1

(58) Field of Classification Search
USPC ............................................. 348/244, 229.1
See application file for complete search history.

(56) References Cited

U.S. PATENT DOCUMENTS

| | | | | |
|---|---|---|---|---|
| 7,657,116 B2* | 2/2010 | Matsuoka et al. | ............ | 382/274 |
| 2005/0083419 A1* | 4/2005 | Honda et al. | ................. | 348/244 |
| 2006/0007507 A1* | 1/2006 | Inaba et al. | ................... | 358/474 |
| 2007/0263111 A1* | 11/2007 | Satodate | ...................... | 348/311 |
| 2010/0026860 A1* | 2/2010 | Oshima | ......................... | 348/243 |

FOREIGN PATENT DOCUMENTS

| | | |
|---|---|---|
| JP | 8-307775 A | 11/1996 |
| JP | 2002-158926 A | 5/2002 |
| JP | 2005-020593 A | 1/2005 |
| JP | 2008-113132 A | 5/2008 |
| JP | 2010-68056 A | 3/2010 |
| JP | 2010-071659 A | 4/2010 |

OTHER PUBLICATIONS

Japanese Office Action dated Jun. 26, 2012 (and English translation thereof) in counterpart Japanese Application No. 2010-260873.

* cited by examiner

*Primary Examiner* — Tuan Ho
*Assistant Examiner* — Chan Nguyen
(74) *Attorney, Agent, or Firm* — Holtz, Holtz, Goodman & Chick, PC

(57) ABSTRACT

An imaging apparatus includes an image sensor, a shutter, a memory, a temperature acquisition unit, a determination unit, and an acquisition controller. The image sensor includes an effective pixel region and an optical black region. The memory temporarily stores photoelectric-converted image data after the shutter is opened. The temperature acquisition unit acquires an ambient temperature when the temperature is determined to be equal to or more than a threshold value when the image data is stored in the memory. The acquisition controller makes control for shutting the shutter and for acquiring photoelectric-converted image data at that time when the temperature is equal to or more than the threshold value. The writing unit cuts out image data of the effective pixel region from the acquired image data. Difference in optical black level is corrected using the cut-out image data.

6 Claims, 3 Drawing Sheets

IMAGING APPARATUS, IMAGE PROCESSING METHOD AND COMPUTER-READABLE STORAGE MEDIUM

CROSS REFERENCE TO RELATED APPLICATION(S)

The present disclosure relates to the subject matters contained in Japanese Patent Application No. 2010-260873 filed on Nov. 24, 2010, which are incorporated herein by reference in its entirety.

FIELD

An exemplary embodiment of the present invention relates to a technique for adjusting an Optical Black (OB) level of an imaging apparatus.

BACKGROUND

An image sensor has been provided with an effective pixel region for photoelectric conversion, and optical black regions provided in horizontal and vertical end portions of the effective pixel region. The optical black regions are for defining an optical black level.

An image signal formed by photoelectric conversion in the effective pixel region is clamped with the black level obtained concurrently from the optical black regions. Thus, the image signal is adjusted to proper brightness.

As for the adjustment method, there has been considered a method which deals with individual difference in optical black level (hereinafter referred to as difference in OB level) among image sensors by a correction table set in each image sensor before factory shipment, for example, as in a technique disclosed in JP-A-2010-068056.

However, the difference in OB level is not generated only by individual difference. For example, the OB level may change in accordance with heat generated during the operation of an apparatus itself. The difference in OB level that may be caused by the heat cannot be adjusted satisfactorily by the correction table set as mentioned above.

SUMMARY

The invention has been developed in consideration of the above. An object of an embodiment of the invention is to provide a technique which can adjust difference in OB level in accordance with an external environment.

An imaging apparatus includes: an image sensor including an effective pixel region and an optical black region that is in an end portion of the effective pixel region; a shutter configured to shield the image sensor from light to be received at the image sensor; a shutter controller configured to control the shutter to be opened and shut; a memory configured to temporarily store image data formed by photoelectric conversion by the image sensor after the shutter controller controls the shutter to be opened; a temperature acquisition unit configured to acquire a temperature of ambience including the image sensor; a determination unit configured to determine whether the temperature acquired by the temperature acquisition unit is equal to or more than a threshold value or not; an acquisition controller configured to control the shutter controller to shut the shutter and to make control to acquire image data formed by photoelectric conversion at the image sensor at that time when the determination unit determines that the temperature is equal to or more than the threshold value; a correction unit configured to cut out image data of the effective pixel region from the image data acquired by the acquisition controller, and to correct difference in optical black level using the cut-out image data of the effective pixel region.

An image processing method includes: controlling a shutter to open, and temporarily storing, in a memory, image data formed by photoelectric conversion at an image sensor that comprises an effective pixel region and an optical black region that is in an end portion of the effective pixel; acquiring a temperature of ambience including the image sensor; determining whether the acquired temperature is equal to or more than a threshold value or not; controlling the shutter to be shut, and making control to acquire image data formed by photoelectric conversion at the image sensor at that time when the temperature is determined to be equal to or more than the threshold value; cutting out image data of the effective pixel region from the acquired image data, and correcting difference in optical black level using the cut-out image data of the effective pixel region.

A computer-readable storage medium stores a program for causing a computer, which is provided in an imaging apparatus having an image sensor and a shutter, to execute procedures including: controlling a shutter to open, and temporarily storing, in a memory, image data formed by photoelectric conversion at an image sensor that comprises an effective pixel region and an optical black region that is in an end portion of the effective pixel; acquiring a temperature of ambience including the image sensor; determining whether the acquired temperature is equal to or more than a threshold value or not; controlling the shutter to be shut, and making control to acquire image data formed by photoelectric conversion at the image sensor at that time when the temperature is determined to be equal to or more than the threshold value; cutting out image data of the effective pixel region from the acquired image data, and correcting difference in optical black level using the cut-out image data of the effective pixel region.

According to the embodiment, it is possible to provide a technique which can adjust difference in OB level in accordance with an external environment, particularly a temperature change.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

An embodiment of the invention will be described below with reference to the drawings.

Figure 1:
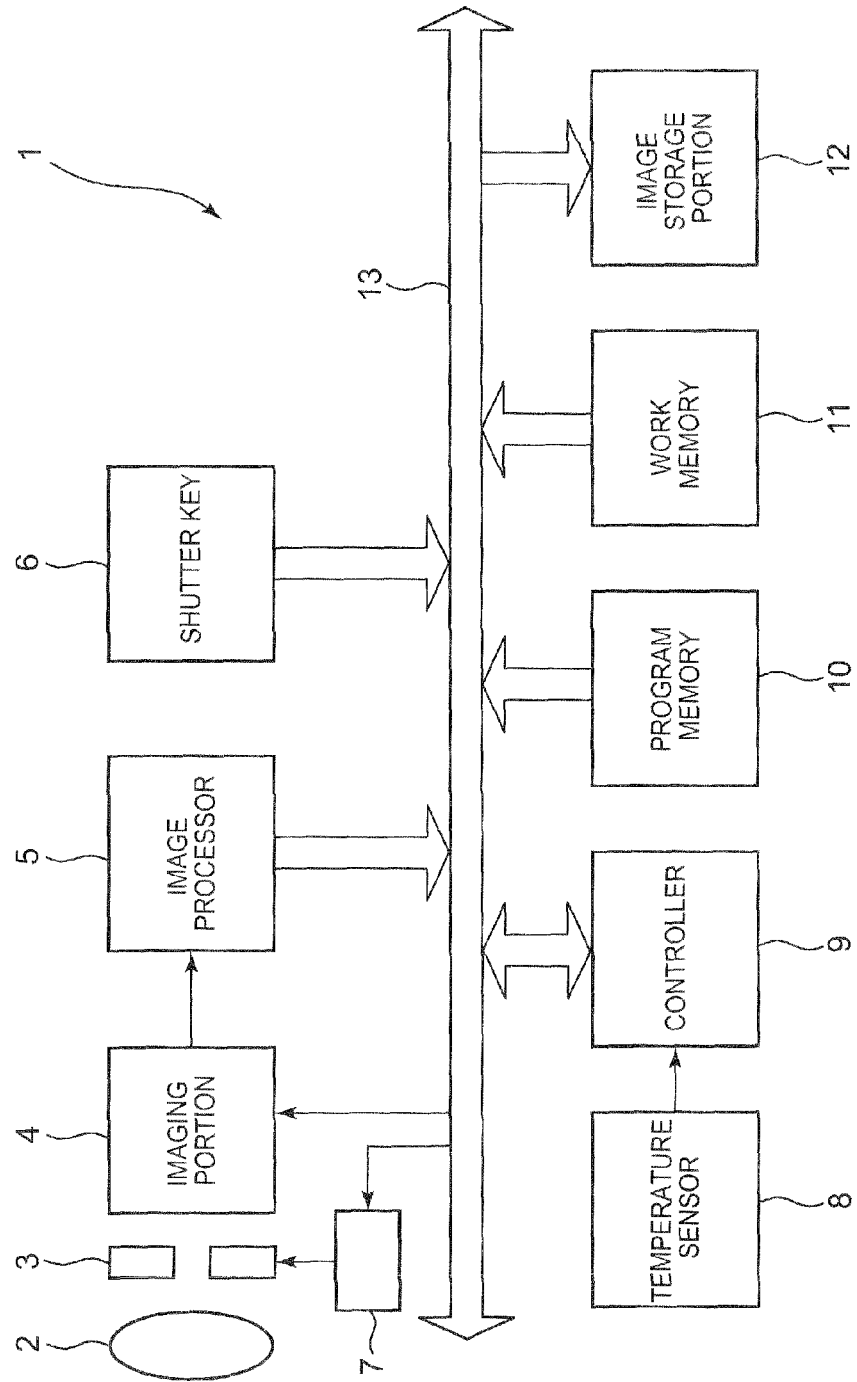
FIG. 1 is a circuit configuration diagram of an imaging apparatus 1 according to an embodiment of the invention.

FIG. 1 is a block diagram showing functions of respective portions of an imaging apparatus 1, which will be explained as an embodiment of the invention. Electric configuration of the imaging apparatus 1 will be described with reference to FIG. 1.

The imaging apparatus 1 is arranged with a controller 9 serving as the center to control the apparatus as a whole. The controller 9 is connected to respective circuit portions of a mechanical shutter 3, an imaging portion 4, an image processor 5, a shutter key 6, a mechanical shutter controller 7, a program memory 10, a work memory 11 and an image storage portion 12 through a bus 13. The controller 9 controls input and/or output of a control signal using the work memory 11 as a working memory in cooperation with a program stored in the program memory 10, so as to control the imaging apparatus 1 as a whole.

A lens 2 is configured by a lens group, for example, which includes a focus lens, a zoom lens, etc.

A temperature sensor 8 is placed in a body of the imaging apparatus 1. The temperature sensor 8 periodically acquires a value of heat generated during the operation of the imaging apparatus 1 and outputs the value of heat to the controller 9.

On receiving an operation signal from the shutter key or an image taking-in control signal determined automatically, the controller 9 controls the mechanical shutter controller 7 in response to the received signal, so as to open the mechanical shutter 3 for a period of exposure time set by photometric processing or the like. Thus, the mechanical shutter 3 is controlled to be opened and/or shut.

Figure 2:
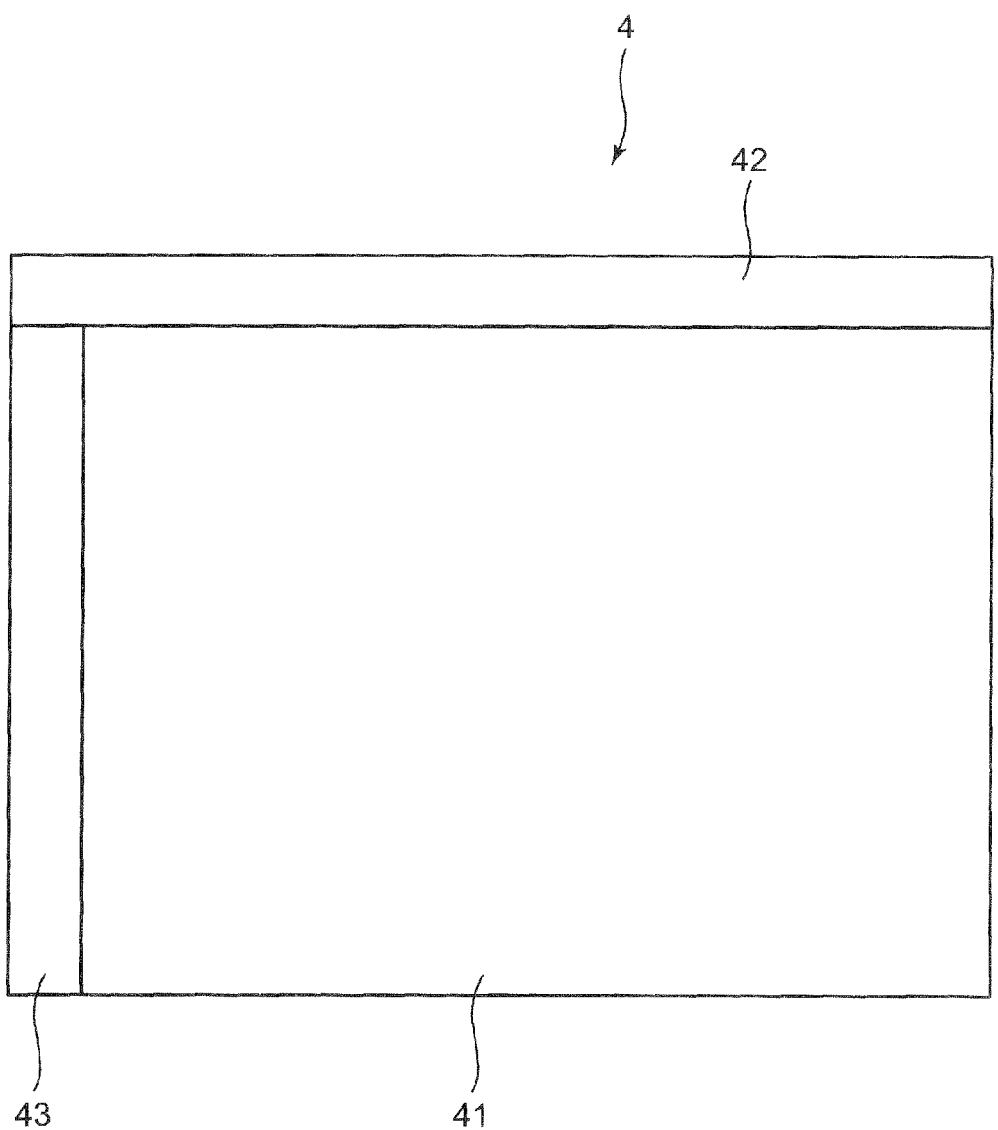
FIG. 2 is a view showing regions set in an imaging portion.

The imaging portion (image sensor) 4 is configured by a device such as a CCD or a CMOS. The imaging portion 4 photoelectrically converts an optical image of a subject focused by the lens 2, so as to generate image data. The generated image data is temporarily stored in the work memory 11. In addition, as shown in FIG. 2, an effective pixel region 41, a vertical OB region 42 and a horizontal OB region 43 are set in advance in the imaging portion 4. The vertical and horizontal OB regions 42 and 43 are located in end portions of the effective pixel region.

The image processor 5 corrects difference in OB level on image data temporarily stored in the work memory 11 under the control of the controller 9, so as to clamp the image data therewith. Various adjustment processings are performed on the thus processed image data which is compressed, encoded and stored in the image storage portion 12.

Figure 3:
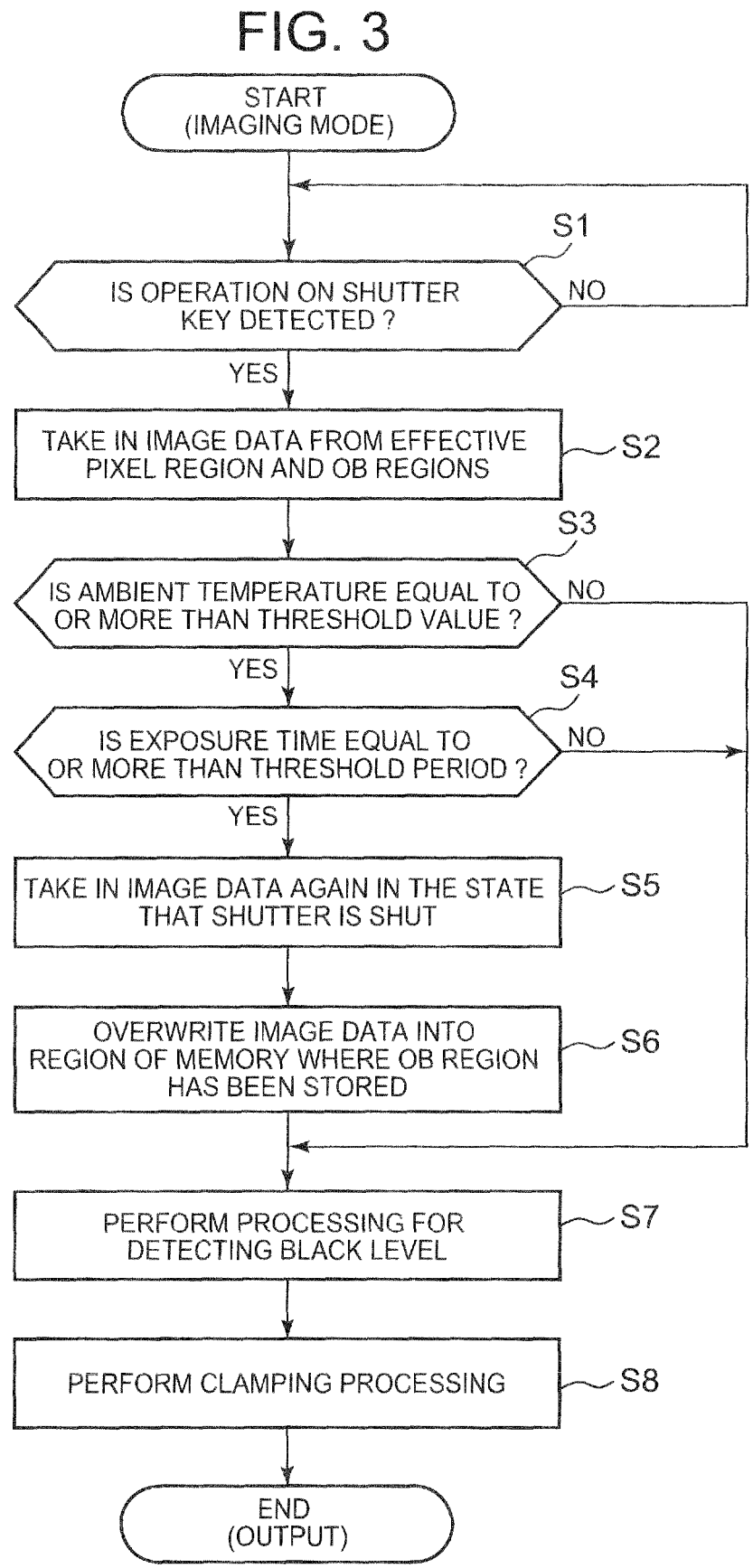
FIG. 3 is a flow chart showing operation of the embodiment.

Operation performed by the controller 9 of the imaging apparatus 1 according to the embodiment will be described with reference to FIG. 3.

First in an imaging mode, the mechanical shutter 3 is controlled to be opened, and an optical image controlled to be zoomed and focused by the lens 2 is taken into the effective pixel region 41 of the imaging portion 4 so that image data is outputted periodically.

On this occasion, the controller 9 cyclically determines whether operation on the shutter key 6 has been detected (or an image taking-in control signal determined automatically has been received) or not (Step S1).

When the determination in Step S1 concludes that operation on the shutter key 6 has been detected (or an image taking-in control signal determined automatically has been received) (Yes in Step S1), image data are taken in and acquired from the effective pixel region 41, the vertical OB region 42 and the horizontal OB region 43 (Step S2), and temporarily stored in the work memory 11. Determination is made as to whether an ambient temperature obtained on this occasion is equal to or more than a threshold value (more specifically, 60° C. to 75° C.) or not (Step S3).

This is because the temperature rise may change the black level of the image data taken in (or acquired) from the vertical OB region 42 or the horizontal OB region 43 in a peripheral portion of the imaging portion 4.

When the determination in Step S3 concludes that the ambient temperature is equal to or more than the threshold value (Yes in Step S3), determination is next made as to whether the exposure time is equal to or more than a threshold period (more specifically, 0.5 to 1 second) or not (Step S4).

This is because the operation of exposure for a certain period may change the black level of the taken-in image data.

When the determination concludes that the ambient temperature is equal to or more than the threshold value (Yes in Step S3) and the exposure time is equal to or more than the threshold period (Yes in Step S4), the black level of the image data taken in and acquired from the vertical OB region 42 and the horizontal OB region 43 may lead to low reliability of OB correction. Therefore, the controller 9 controls the mechanical shutter controller 7 to shut the mechanical shutter 3 (shield from light) and makes control to take in and acquire image data from the effective pixel region 41, the vertical OB region 42 and the horizontal OB region 43 again in this state (Step S5).

After that, of the image data taken in and acquired in Step S5, a central region of the image data of the effective pixel region 41 having almost the same area as the vertical OB region 42 is acquired so that the image data of the vertical OB region 42 temporarily stored in the work memory 11 is overwritten (newly written) with the central region of the image data of the effective pixel region 41 (Step S6).

This is because there is a low possibility that the vicinities of the center of the imaging portion (image sensor) 4 may be affected even if the ambient temperature is increased to some extent and the exposure time is increased to some extent. That is, the black level of the image data shielded from light is more reliable in OB correction.

In addition, since the OB region is overwritten in the work memory 11, the load on the memory can be lightened even if the image data has a large number of pixels.

Although this embodiment has been described on the processing for overwriting the vertical OB region 42, only the horizontal OB region 43 may be overwritten or both the vertical OB region 42 and the horizontal OB region 43 may be overwritten.

After that, the black level of the OB region stored in the work memory 11 is detected (Step S7), and the difference in OB level is corrected so that the image data is clamped therewith (Step S8).

The image data clamped in Step S8 is then outputted to the next image processing process in the image processor 5, and the processing is terminated.

When the determination in Step S3 concludes that the ambient temperature is lower than the threshold value and the determination in Step S4 concludes that the exposure time is lower than the threshold period, the acquired black level in the OB region is regarded as reliable so that the image data is clamped in Step S8.

Priority is given to the determination in Step S3 over the determination in Step S4. It does not matter that the determination in Step S4 is omitted because the reliability in black level may be secured even if the determination in Step S4 is omitted.

The aforementioned embodiment and each modification have been described in the case where the invention is applied to an imaging apparatus. However, the invention is also applicable to another camera apparatus such as a digital video camera or a camera-including cellular phone terminal, a personal computer, etc. as long as the apparatus has a function of creating image information.

Finally, the aforementioned embodiment and each modification according to the invention are merely examples of the mode for carrying out the invention, which do not intend to limit the attached claims. Therefore, it should be noted that any of various modifications that can be made on the embodiment of the invention is included in the scope of the invention and included in the attached claims.

What is claimed is:

1. An imaging apparatus comprising:
    an image sensor;
    a setting unit configured to preliminarily set in the image sensor an effective pixel region and an optical black region that is at an end portion of the effective pixel region;
    a shutter configured to shield the image sensor from light to be received at the image sensor;
    a shutter controller configured to control the shutter to be opened and shut;
    a memory configured to temporarily store image data formed by photoelectric conversion by the image sensor after the shutter controller controls the shutter to be opened;
    a temperature acquisition unit configured to acquire an ambient temperature around the image sensor;
    a determination unit configured to determine whether or not the temperature acquired by the temperature acquisition unit is equal to or more than a threshold value;
    an acquisition controller configured to control the shutter controller to shut the shutter and to perform control to acquire image data formed by photoelectric conversion at the image sensor with the shutter shut, when the determination unit determines that the temperature is equal to or more than the threshold value;
    a first correction unit configured to cut out image data of the effective pixel region from the image data acquired by the acquisition controller with the shutter shut, and to correct a difference in an optical black level using the cut-out image data of the effective pixel region, when the determination unit determines that the temperature is equal to or more than the threshold value; and
    a second correction unit configured to correct a difference in the optical black level using image data of the optical black region from the image data acquired with the shutter opened, without acquiring image data with the shutter shut by the acquisition controller and without using the cut-out image data, when the determination unit determines that the temperature is not equal to or more than the threshold value.

2. The imaging apparatus of claim 1, wherein the determination unit determines whether or not the temperature acquired by the temperature acquisition unit is equal to or more than the threshold value when the image data is stored in the memory.

3. The imaging apparatus of claim 1, further comprising a writing unit configured to newly write the cut-out image data of the effective pixel region into the optical black region of the image data stored in the memory,
    wherein the correction unit corrects the difference in the optical black level using the image data written by the writing unit.

4. The imaging apparatus of claim 1, further comprising an exposure time determination unit configured to determine whether or not an exposure time is equal to or more than a threshold period,
    wherein the image sensor stores more heat in an ambient area as the exposure time is longer, and
    wherein the acquisition controller controls the shutter controller to shut the shutter and performs control to acquire image data formed by photoelectric conversion at the image sensor when the determination unit determines that the temperature is equal to or more than the threshold value and the exposure time determination unit determines that the exposure time is equal to or more than the threshold period.

5. An image processing method for an imaging apparatus which comprises an image sensor and a shutter configured to shield the image sensor from light to be received at the image sensor, the method comprising:
    preliminarily setting in the image sensor an effective pixel region and an optical black region that is at an end portion of the effective pixel region;
    controlling the shutter to open, and temporarily storing, in a memory, image data formed by photoelectric conversion at the image sensor;
    acquiring an ambient temperature around the image sensor;
    determining whether or not the acquired temperature is equal to or more than a threshold value;
    when it is determined that the temperature is equal to or more than the threshold value, (i) controlling the shutter to be shut, and performing control to acquire image data formed by photoelectric conversion at the image sensor with the shutter shut, and (ii) cutting out image data of the effective pixel region from the image data acquired with the shutter shut, and correcting a difference in an optical black level using the cut-out image data of the effective pixel region; and
    when it is determined that the acquired temperature is not equal to or more than the threshold value, correcting a difference in the optical black level using image data of the optical black region from the image data acquired with the shutter opened, without acquiring image data with the shutter shut and without using the cut-out image data.

6. A non-transitory computer-readable storage medium having stored thereon a program that is executable by a computer which is provided in an imaging apparatus comprising an image sensor and a shutter configured to shield the image sensor from light to be received at the image sensor, the program being executable by the computer to perform functions comprising:
    preliminarily setting in the image sensor an effective pixel region and an optical black region that is at an end portion of the effective pixel region;
    controlling the shutter to open, and temporarily storing, in a memory, image data formed by photoelectric conversion at the image sensor;
    acquiring an ambient temperature around the image sensor;
    determining whether or not the acquired temperature is equal to or more than a threshold value;
    when it is determined that the temperature is equal to or more than the threshold value, (i) controlling the shutter to be shut, and performing control to acquire image data formed by photoelectric conversion at the image sensor with the shutter shut, and (ii) cutting out image data of the effective pixel region from the image data acquired with the shutter shut, and correcting a difference in an optical black level using the cut-out image data of the effective pixel region; and
    when it is determined that the temperature is not equal to or more than the threshold value, correcting a difference in the optical black level using image data of the optical black region from the image data acquired with the shutter opened, without acquiring image data with the shutter shut and without using the cut-out image data.

* * * * *